(12) United States Patent
Katou et al.

(10) Patent No.: US 9,036,196 B2
(45) Date of Patent: May 19, 2015

(54) METHOD FOR SETTING A PROCESSING CONDITION IN AN IMAGE PROCESSING APPARATUS

(75) Inventors: Hiroyo Katou, Shizuoka-ken (JP); Yoshikatsu Kamisuwa, Tokyo-to (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1119 days.

(21) Appl. No.: 12/761,733

(22) Filed: Apr. 16, 2010

(65) Prior Publication Data

US 2010/0265547 A1   Oct. 21, 2010

Related U.S. Application Data

(60) Provisional application No. 61/170,912, filed on Apr. 20, 2009.

(51) Int. Cl.
  *G06K 15/00* (2006.01)
  *G06F 3/12* (2006.01)
  *H04N 1/00* (2006.01)

(52) U.S. Cl.
  CPC ............ *G06F 3/1204* (2013.01); *G06F 3/1258* (2013.01); *H04N 1/0035* (2013.01); *H04N 1/0044* (2013.01); *H04N 1/0097* (2013.01); *H04N 2201/3276* (2013.01)

(58) Field of Classification Search
  CPC .............. G06F 3/1204–3/1206; G06F 3/1258; G06F 3/04842; G06F 21/305; G06F 3/1257; G06F 3/1265; G06F 3/1284; G06F 3/1297; G06F 3/1205; G06F 3/125; G06F 3/1253; G06F 3/1254; G06K 15/00; G06K 15/002; G06K 15/1814; G06K 15/1822; G06K 15/02; H04N 1/00413

USPC .............................. 358/1.16, 1.13, 1.15, 1.18
  See application file for complete search history.

(56) References Cited

U.S. PATENT DOCUMENTS 7,719,701 B2 *   5/2010   Momose et al. ............. 358/1.16
7,884,981 B2 *   2/2011   Mishima et al. ............. 358/1.18
(Continued)

FOREIGN PATENT DOCUMENTS

| JP | 2000172469 | 6/2000 |
| JP | 2000235466 | 8/2000 |
| JP | 2008234000 | 10/2008 |

*Primary Examiner* — Benny Q Tieu
*Assistant Examiner* — Juan M Guillermety
(74) *Attorney, Agent, or Firm* — Amin, Turocy & Watson, LLP

(57) ABSTRACT

A processing condition setting device for setting a processing condition in an image processing apparatus comprises a history storage section storing a plurality of previous setting details includes a combination of a plurality of setting conditions in correlation with processing objects, a first display section displaying processing objects stored in history storage section, a candidate selecting section selecting as a setting candidate setting details corresponding to processing object, which is selected from processing objects displayed by first display section, from plurality of previous setting details stored in history storage section, a second display section displaying setting candidates selected on basis of selected processing object by candidate selecting section, and a history updating section storing setting details of process, which is performed in a state where one setting candidate is selected from setting candidates displayed by second display section, in history storage section.

18 Claims, 17 Drawing Sheets

(56) References Cited

U.S. PATENT DOCUMENTS

| | | |
|---|---|---|
| 2007/0109580 A1* | 5/2007 | Yoshida ........................ 358/1.13 |
| 2007/0183002 A1* | 8/2007 | Corona ........................ 358/1.13 |
| 2008/0030818 A1* | 2/2008 | Nagahara et al. ............. 358/537 |
| 2008/0037062 A1* | 2/2008 | Omino et al. ................ 358/1.15 |
| 2009/0086268 A1* | 4/2009 | Iwashita ...................... 358/1.15 |
| 2009/0116063 A1* | 5/2009 | Takashima ................... 358/1.15 |
| 2009/0210821 A1* | 8/2009 | Omiya ......................... 715/828 |
| 2009/0251729 A1* | 10/2009 | Nakawaki .................... 358/1.15 |
| 2010/0259774 A1 | 10/2010 | Kamisuwa et al. |

* cited by examiner

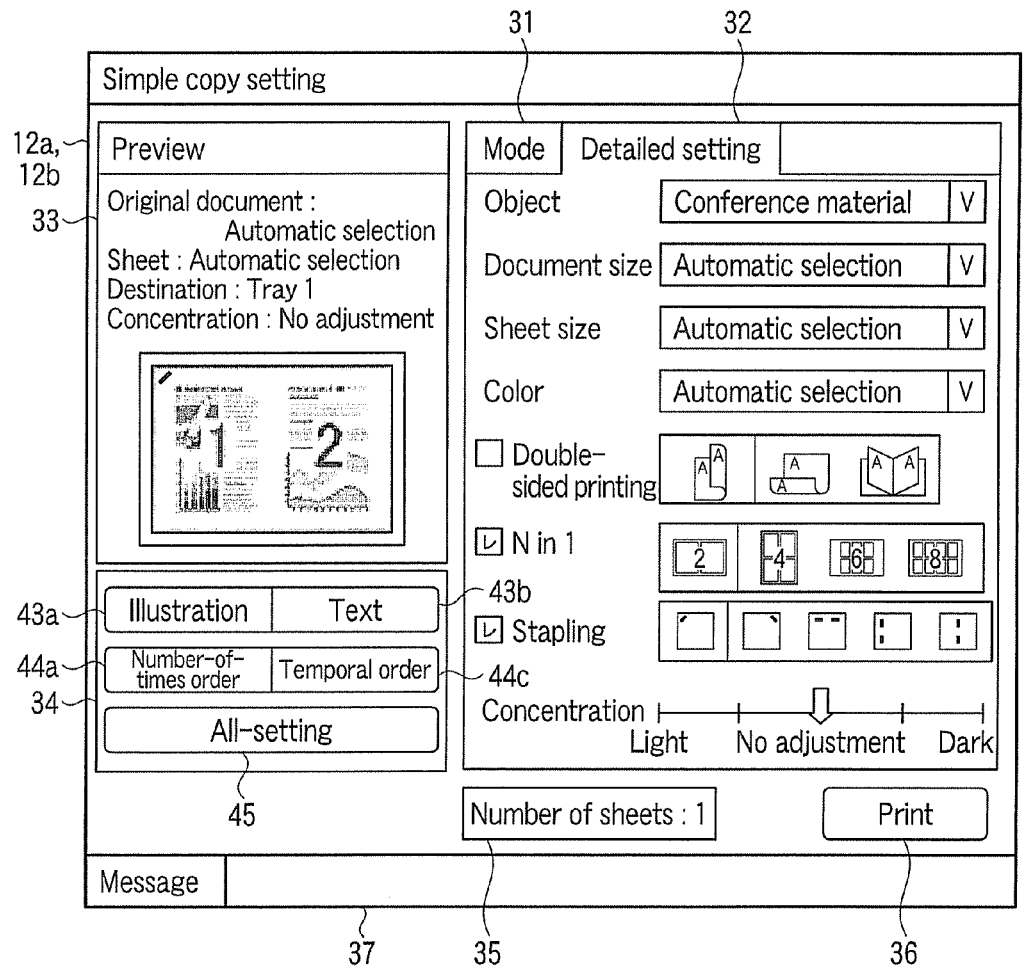
F I G. 4

| No | User name | Setting history information |
|---|---|---|
| 1 | User A | •——┐ |
| 2 | User B |  |
| ... |  |  |

26a

| No | Document size | Sheet size | Color | Double-sided printing | N in1 | Stapling | Concen-tration | Oper-ation | Object | Number of setting times | Newest setting date | Number-of-times order | Temporal order | Non-recom-mended level |
|---|---|---|---|---|---|---|---|---|---|---|---|---|---|---|
| 1 | Automatic setting | Automatic setting | Auto Color | None | 2 in1 | Stapling at right-upper | No adjustment | Copy | Conference material | 20 | 2009/10/03 17:00:50 | 1 | 2 | 0 |
| 2 | Automatic setting | Automatic setting | Auto Color | One-sided→Double-sided | 2 in1 | Stapling at right-upper | No adjustment | Copy | Conference material | 13 | 2009/09/25 15:05:07 | 2 | 3 | 0 |
| 3 | Automatic setting | Automatic setting | Auto Color | One-sided→Double-sided | 4 in1 | None | No adjustment | Copy | Conference material | 5 | 2009/10/05 10:30:25 | 4 | 1 | 0 |
| 4 | Automatic setting | Automatic setting | Auto Color | None | None | Stapling at right-upper | No adjustment | Copy | Conference material | 8 | 2009/09/01 09:05:47 | 3 | 4 | 0 |
| ... |  |  |  |  |  |  |  |  |  |  |  |  |  |  |

F I G. 5

| Setting item | Type | Threshold | Score |
|---|---|---|---|
| A3 | Sheet size | 45 | 50 |
| A4 | Sheet size | 45 | 10 |
| 2in1 | Nin1 | 60 | 1 |
| One-sided→double-sided | Double-sided printing | 30 | 40 |
| 4in1 | Nin1 | 60 | 1 |
| Stapling at right-upper | Stapling | 50 | 12 |
| Monochromatic | Color | 100 | 10 |
| Cassette 1 | Paper feed stop | 100 | 10 |
| Color | Color | 33 | 45 |

26c

⋮

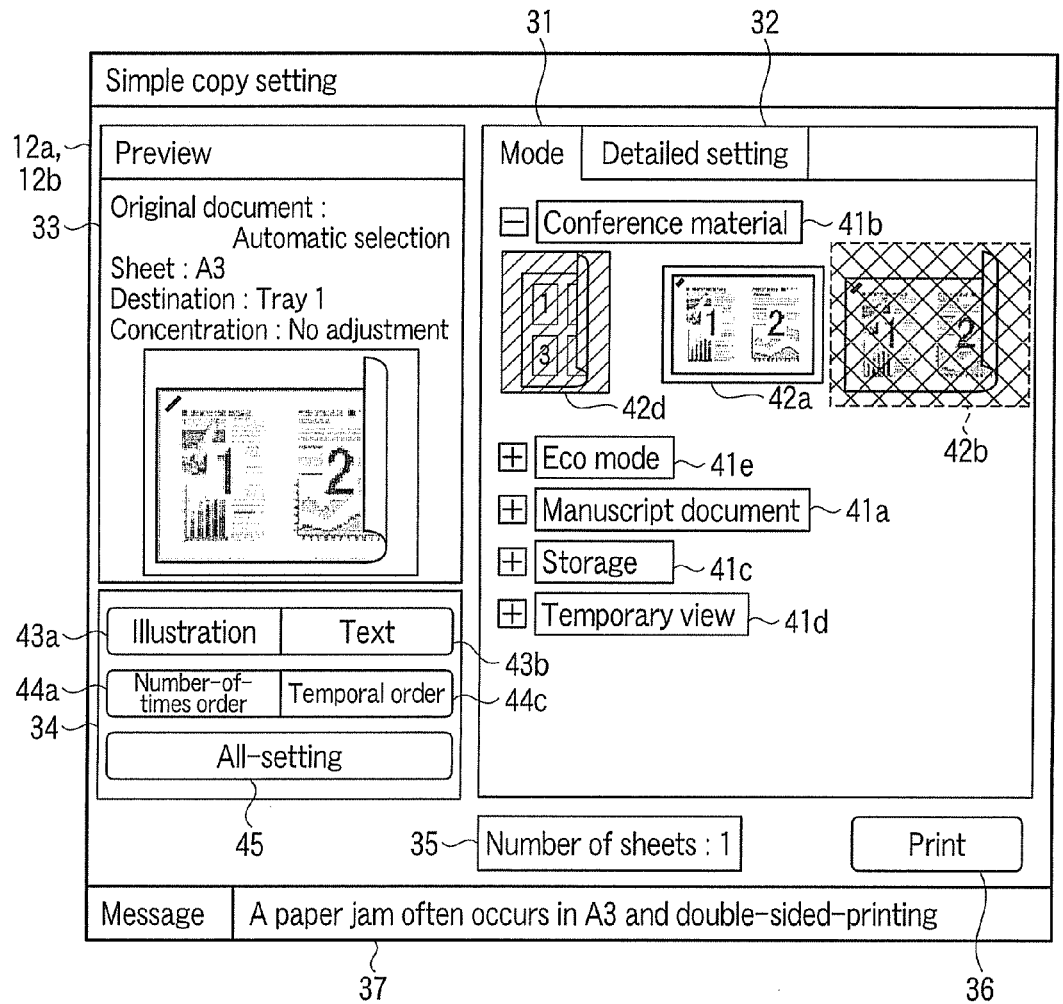
F I G. 12

FIG. 17

Simple scan setting

Preview

Destination : Shared folder
Name : DOC090311
Format : Highly-compressed PDF
Resolution : 200dpi
Original document : Automatic
Concentration : No adjustment

| Illustration | Text |
| Number-of-times order | Temporal order |
| All-setting ||

Mode | Detailed setting

⊞ Manuscript document
⊟ Storage
  ├ Highly-compressed PDF : Double-sided
  ├ PDF full color, resolution : 400
  └ Highly-compressed PDF : Mixed-size document
⊞ Distribution Number of sheets : 1    Print Message

METHOD FOR SETTING A PROCESSING CONDITION IN AN IMAGE PROCESSING APPARATUS

CROSS-REFERENCE TO RELATED APPLICATION

This application claims the benefit of U.S. Provisional Application No. 61/170,912, filed Apr. 20, 2009.

TECHNICAL FIELD

The present invention relates to a processing condition setting device and a processing condition setting method of setting a setting condition such as printing conditions in a multi-function image processing apparatus such as a digital multi-function peripheral.

BACKGROUND

In recent years, image processing apparatuses such as digital multi-function peripherals have increased the number of their functions. The multi-function image forming apparatuses can perform a printing operation which combines plural printing conditions into a complex condition. For example, some digital multi-function peripherals in recent years have a stapling function, a punching function, and the like which are laborious if done manually. However, since the number of setting items increases with an increase in the number of functions or an improvement in function quality of the digital multi-function peripherals, the setting details are complicated. For example, in some digital multi-function peripherals, several tens of setting items may be often set on a single operation screen (setting screen). Accordingly, some users who are poor at operation thereof may suffer from mental pains in operating the complicated setting screen or may not satisfactorily use various functions of the digital multi-function peripherals.

For example, JP-A-2008-234000 discloses a technique of disposing a common display area in a setting screen comprising plural tabs and changing setting items in the common display area depending on setting frequencies of the setting items. The setting items in the common display area can be changed by a user by dragging and dropping a setting item in the tabs. However, the user does not have a fixed object for printing. For example, the details of the print setting can be greatly changed depending on the object of the printing. Accordingly, in such operation types that printing operations having different objects are frequently performed, the technique described in JP-A-2008-234000 has a problem in that it is difficult for the user to always provide the setting items suitable for the printing object in the common display area and the print settings may be complicated.

SUMMARY

According to an aspect of the invention, there is provided a processing condition setting device comprising: a history storage section setting a processing condition in an image processing device and storing a plurality of previous setting details comprising a combination of a plurality of setting conditions in correlation with processing objects; a first display section displaying the processing objects stored in the history storage section; a candidate selecting section selecting as a setting candidate the setting details corresponding to the processing object, which is selected from the processing objects displayed by the first display section, from the plurality of previous setting details stored in the history storage section; a second display section displaying the setting candidates selected on the basis of the selected processing object by the candidate selecting section; and a history updating section storing the setting details of the process, which is performed in a state where one setting candidate is selected from the setting candidates displayed by the second display section, in the history storage section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 4 is a diagram illustrating an example of a detailed setting screen of the simple setting screen.

FIG. 5 is a diagram illustrating a configuration of a history database.

FIG. 12 is a diagram illustrating an example where illustrations as the setting candidates are displayed in a display state based on the non-recommended levels.

FIG. 17 is a diagram illustrating an example of a detailed setting screen in simple print setting.

FIG. 18 is a diagram illustrating an example of the simple setting screen in which plural object setting candidates are displayed in simple scan setting.

FIG. 19 is a diagram illustrating an example of a detailed setting screen in the simple scan setting.

DETAILED DESCRIPTION

Hereinafter, embodiments of the invention will be described with reference to the accompanying drawings.

Figure 1:
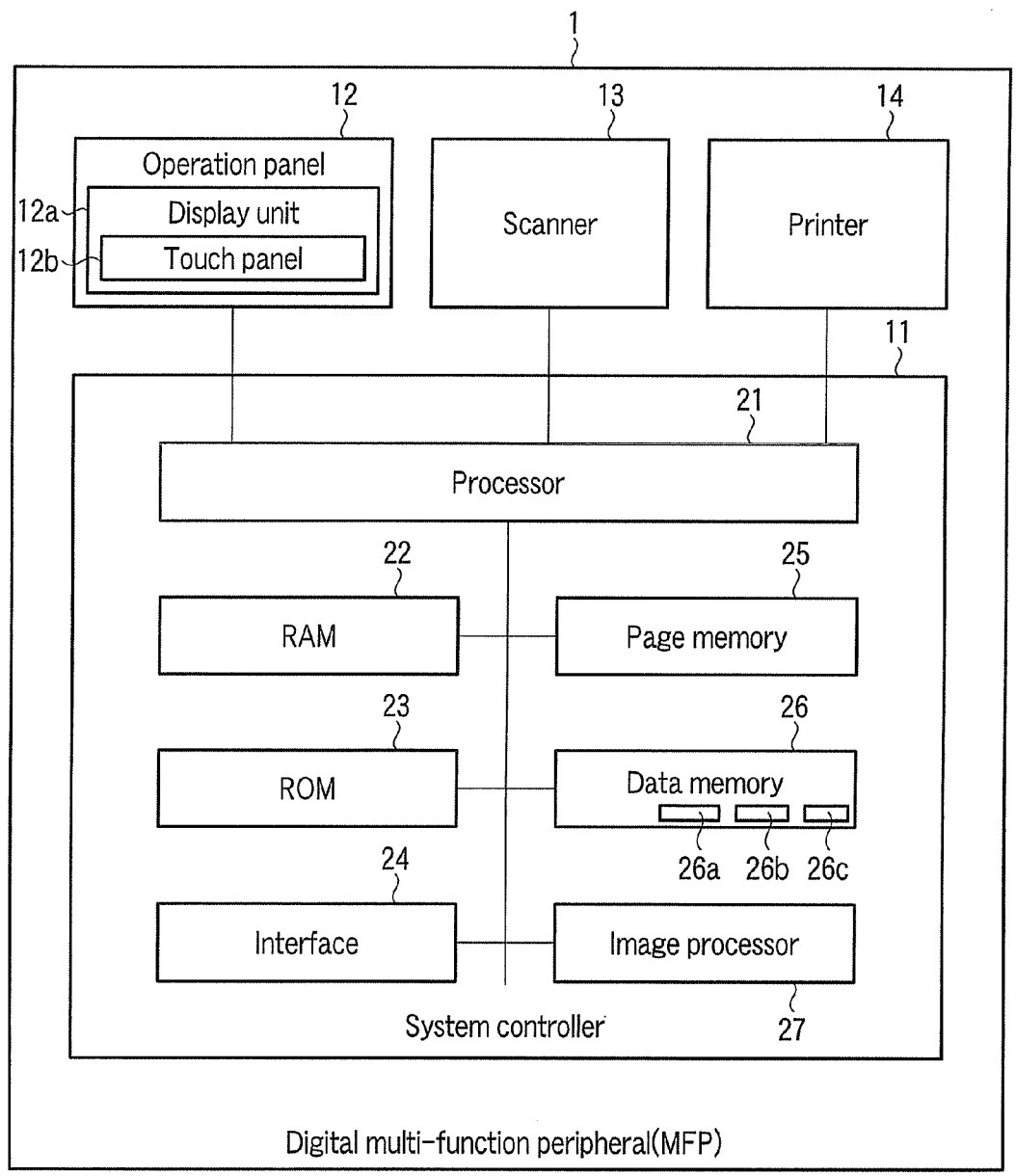
FIG. 1 is a diagram illustrating a hardware configuration of a digital multi-function peripheral as an image forming apparatus.

FIG. 1 is a diagram illustrating a hardware configuration of a digital multi-function peripheral 1 as a processing condition setting device.

As shown in FIG. 1, the digital multi-function peripheral (MFP) 1 comprises a system controller 11, an operation panel 12, a scanner 13, and a printer 14.

The system controller 11 controls the overall operation of the digital multi-function peripheral 1. The system controller 11 is connected to the operation panel 12, the scanner 13, and the printer 14. According to this configuration, the system controller 11 receives an operation instruction input to the operation panel 12 and controls the scanner 13 and the printer 14.

The operation panel 12 is a user interface to which a user's operation instruction is input. The operation panel 12 comprises hard keys such as numerical keys and a display unit 12a having a built-in touch panel 12b. Operation guidance or touch keys which can be selected using the touch panel 12b are displayed on the display unit 12a of the operation panel 12. In the operation panel 12, the input to the touch keys displayed on the display unit 12a is sensed by the use of the touch panel 12b. For example, setting information of various functions specified by a user is input using the operation panel 12 and is sent to the system controller 11.

The scanner 13 converts an image of an original document into image data. The scanner 13 converts the image of an original document into color or black-and-white digital image data. The printer 14 forms an image on a sheet as an image forming medium. The printer 14 has printing functions of black-and-white printing, color printing, bicolor printing, double-sided printing, and the like. The printer 14 has sheet processing functions such as stapling and punching.

The system controller 11 comprises a processor 21, a RAM (Random Access Memory) 22, a ROM (Read Only Memory) 23, an interface 24, a page memory 25, a data memory 26, and an image processor 27.

The processor 21 controls the overall operations of the system controller 11. The processor 21 embodies various processes by operating on the basis of control programs. Various functions such as data processing and display control to be described later are embodied by causing the processor 21 to execute the control programs. The RAM 22 is a memory temporarily storing work data or storing reference data. The ROM 23 is a nonvolatile memory. The ROM 23 stores, for example, control programs and control data for controlling the digital multi-function peripheral 1. The interface 24 makes data communications via a network not shown. The page memory 25 is a memory having a memory area for developing image data corresponding to at least one page.

The data memory 26 is also used as a memory for backing up various data and stores various setting data or management data. The data memory 26 is constructed, for example, by an HDD. The image processor 27 serves to perform various types of image processing on the image data. The image processor 27 performs image processing such as image magnification, image rotation, image layout correction, image quality correction, and compression and decompression.

The data memory 26 comprises a history database 26a, an object database 26b, and a non-recommended data table 26c. The history database 26a is a storage section storing the setting details in the performed process as setting history information. The object database 26b is a storage section storing information on the objects of the setting details as object history information. The non-recommended data table 26c is a storage section storing data for determining the setting items or the like having an error generated therein. The history database 26a, the object database 26b, and the non-recommended data table 26c will be described in detail later.

In the digital multi-function peripheral 1 having the above-mentioned configuration, various functions to be described later are embodied by causing the processor 21 to execute the control programs stored in the ROM 23 or the data memory 26. The functions to be described later may be embodied by causing the processor 21 of a personal computer to execute the control programs. That is, the functions to be described later may be provided as a program such as a printer driver which operates in a computer such as a personal computer.

A simple setting process for copy in the digital multi-function peripheral 1 will be described below.

Figure 2:
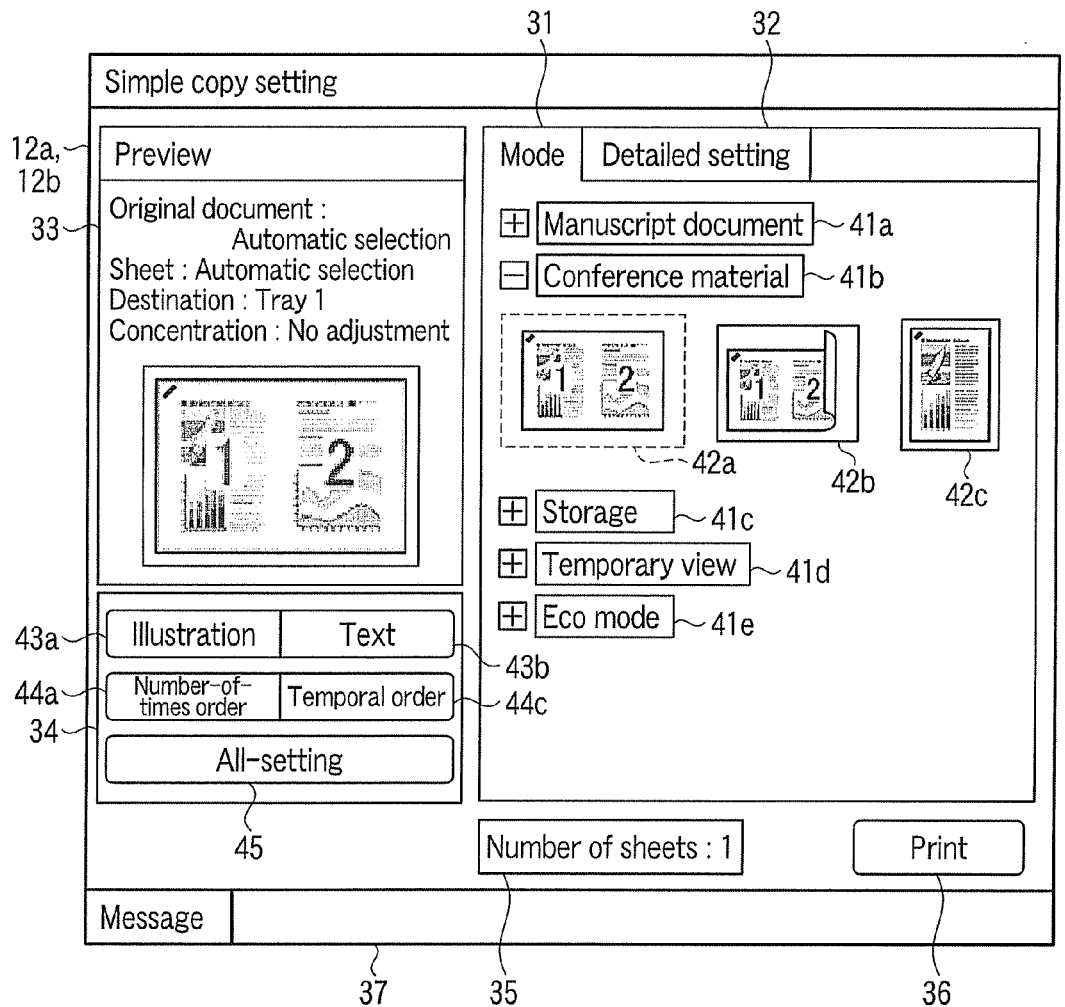
FIG. 2 is a diagram illustrating an example of a simple setting screen in which plural object setting candidates are displayed in illustrations.

FIG. 2 shows a setting screen for simple setting (simple setting screen) in copy setting. The simple setting screen shown in FIG. 2 is displayed, for example, on the display unit 12a of the operation panel 12. A mode tab 31, a detailed setting tab 32, a preview display column 33, a display setting column 34, a sheet number display frame 35, a print button 36, and a message display column 37 are displayed in the simple setting screen shown in FIG. 2.

One of the mode tab 31 and the detailed setting tab 32 is selected. For example, it is assumed that the mode tab 31 is selected in an initial state and the detailed setting tab 32 is selected by a user's instruction. FIG. 2 shows an example of the setting screen in a state where the mode tab 31 is selected.

In the mode tab 31, plural object setting candidates are displayed. In the example shown in FIG. 2, plural object items 41a to 41e and illustrations 42a to 42c representing plural setting candidates in the object item in the selected state are displayed in the mode tab 31. In the example shown in FIG. 2, "manuscript document", "conference material", "storage", "temporary view", and "eco mode" are displayed as the object items 41a to 41e. In the example shown in FIG. 2, the object item 41b of "conference material" is selected among the object items 41a to 41e.

In the example shown in FIG. 2, plural illustrations 42a to 42c are displayed as plural setting candidates for the object of "conference material". The illustrations 42a to 42c show the final states if a process should have been performed on the basis of the setting details of each setting candidate. In the example shown in FIG. 2, the illustration 42a represents a setting candidate comprising the setting conditions of "2in1 and stapling". The illustration 42b represents a setting candidate comprising the setting conditions of "2in1, one-sided→double-sided, and stapling". The illustration 42c represents a setting candidate comprising the setting condition of "stapling".

The preview display column 33 displays text information representing the setting details of the setting candidate in the selected state and a preview image representing the final state, if a process should have been performed on the basis of the setting details of the setting candidate in the selected state. In the text information, the primary setting details of the setting candidate in the selected state are displayed in texts. The preview image may display an enlargement of the illustration of the setting candidate in the selected state in the mode tab 31, as shown in FIG. 2.

The display setting column 34 displays a button for causing a user to instruct the details displayed in the setting screen. An illustration button 43a, a text button 43b, a number-of-times order button 44a, a temporal order button 44b, and an all-setting button 45 are displayed in the display setting column 34.

The illustration button 43a and the text button 43b are switch buttons and one thereof is selected. As shown in FIG. 2, the illustration button 43a is a button for instructing to display the illustrations 42a to 42c representing the setting candidates, respectively. In the state where the illustration button 43a is selected, the processor 21 generates the illustration representing the setting details of the setting candidates on the basis of the settings of the setting candidates, and displays the generated illustrations as the setting candidates.

Figure 3:
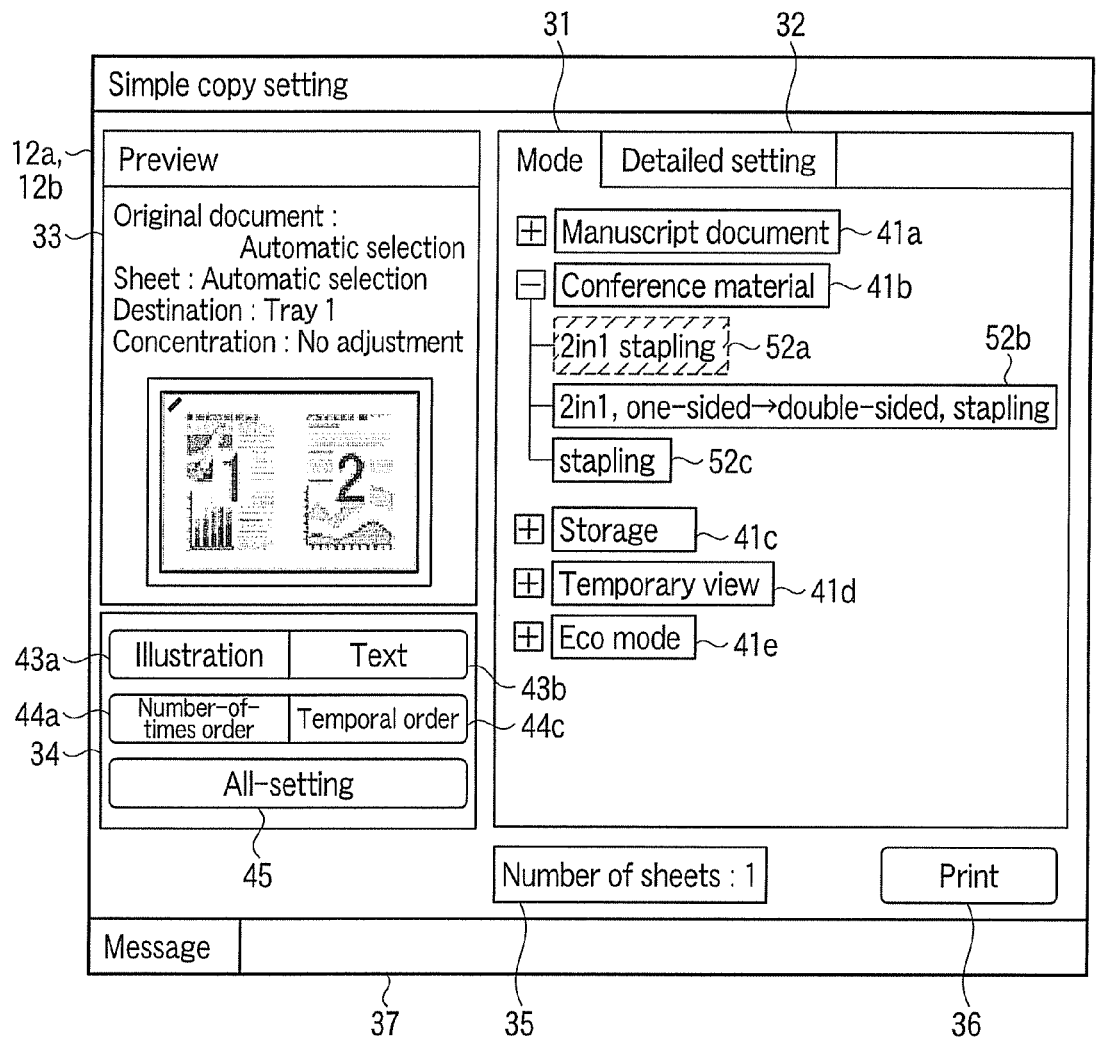
FIG. 3 is a diagram illustrating an example of a simple setting screen in which plural object setting candidates are displayed in texts.

The text button 43b is a button for instructing to display the texts 52a to 52b representing the setting candidates, respectively. In the state where the text button 43b is selected, the processor 21 generates the text information representing the setting details of the setting candidates on the basis of the setting conditions of the setting candidates and displays the generated text information as the setting candidates. For example, FIG. 3 shows an example where plural setting candidates are displayed in a plurality of text information. In the example shown in FIG. 3, icons 52a to 52c of texts belonging to the object item 41b of "conference material" are displayed in the mode tab 31. The illustrations 42a to 42c shown in FIG. 2 and the text icons 52a to 52c shown in FIG. 3 correspond to each other, and are switched and displayed whenever the illustration button 43a and the text button 43b are switched to each other.

The number-of-times order button 44a and the temporal order button 44b are switch buttons and one thereof is selected. The number-of-times order button 44a is a button for instructing to select plural object setting candidates to be displayed in the mode tab 41 in the order in which the number of times (frequency) if the same setting details (setting candidate) are previously performed increases. If the number-of-times order button 44a is selected, the processor 21 searches the previous setting details (setting candidates) used for the object in the selected state, selects plural setting candidates in a display order based on the number of previous setting times of each setting candidate for the object, and displays the selected setting candidates in illustrations or texts.

The temporal order button 44b is a button for instructing to select plural object setting candidates to be displayed in the mode tab 41 in the order in which the time if the setting is performed goes to the past. If the temporal order button 44b is selected, the processor 21 searches the previous setting details (setting candidates) used for the object in the selected state, selects plural setting candidates in a display order based on the temporal setting order of the setting candidates for the object, and displays the selected setting candidates in illustrations or texts.

The number of copies (printed sheets) is displayed in the sheet number display frame 35. The print button 36 is a button for instructing to start the copy (print) with the selected setting details. The message display column 37 is a display column for displaying guidance or alarm of the selected setting candidates. For example, if a setting candidate comprising a setting condition with a high frequency of errors is selected, a message for alerting a user in the selected setting candidate is displayed in the message display column 37.

If the detailed setting tab 32 is selected, a detailed setting screen is displayed on the display unit 21. FIG. 4 shows an example of the detailed setting screen as the detailed setting tab. If the detailed setting tab 32 is selected, as shown in FIG. 4, the setting conditions of the setting candidate selected in the mode tab 31 is reflected and displayed in the detailed setting screen in the simple setting. For example, if the user does not select anything in the mode tab 31, the detailed setting screen is displayed in a state where initial setting objects and setting conditions in the initial setting candidates are reflected.

The example shown in FIG. 4 is an example of the detailed setting screen in which the detailed setting tab 32 is selected in the state where the setting candidate comprising "conference material" as an object item and "2in1 and stapling" as setting conditions is selected in the mode tab 31. In the detailed setting screen shown in FIG. 4, "conference material" is selected as the object and "2in1" and "stapling" are selected as the setting items. In this detailed setting screen, the user can change the setting conditions. The setting conditions changed in the detailed setting screen are reflected as setting conditions in the selected setting candidate. Accordingly, information such as an illustration in which the setting conditions input (changed) in the detailed setting screen are reflected is displayed in the preview display column 33.

The history database 26a used to select plural setting candidates by objects will be described.

The plural setting candidates displayed by objects in the simple setting screen are selected on the basis of setting history information stored in the history database 26a. That is, the processor 21 selects plural setting candidates by objects from the previous setting details (previously-selected setting candidates) stored in the history database 26a. The setting details stored in the history database 26a are information provided as object setting candidates.

The previous setting details used as the setting candidates are stored in correlation with the "objects" in the history database 26a. The processor 21 searches the setting candidates as the previous setting details stored in the history database 26a by objects. The number of setting times (frequency) and the newest setting time are stored in correlation with the setting details (setting candidates) stored in the history database 26a. The processor 21 selects plural object setting candidates on the basis of the order of the numbers of setting times or the order of newest setting times from the history database 26a.

Here, it is assumed that the history database 26a stores setting history information representing the previous setting details (setting candidates) set in the simple setting. For example, if a copy process is performed with the setting candidate selected in the simple setting screen, the history database 26a stores the setting details of the copy process as the setting candidates correlated with the "objects" by users. Whenever a user performs the processes such as the copy process with the setting details selected in the simple setting screen, the history database 26a updates the number of setting times or the setting time of the previous setting details (setting candidates). If the number of setting times or the setting time of the previous setting details (setting candidates) is changed, the plural setting candidates displayed in the simple setting screen are changed. For example, even if an initial value of a setting candidate is set, the number of setting times and the setting time of the setting candidate are changed whenever a user performs the processes with the setting details selected in the simple setting screen. Accordingly, the display order of the plural setting candidates displayed by objects is changed.

It is necessary to determine the initial values of the setting candidates in consideration of unit configurations of the digital multi-function peripheral. For example, the digital multi-function peripheral may be mounted with a reverse automatic document feeder (RADF), a finisher, and a large-capacity feeder (LCF) as options. That is, since the setting conditions to be set are different depending on the units mounted on the digital multi-function peripheral, the initial values of the setting candidates are changed depending on the unit configurations of the digital multi-function peripheral. For example, if the finisher is mounted, the stapling can be set as the setting condition. If the RADF is mounted, the reading of a double-sided document can be set as the setting condition. The setting of the initial values can be performed in an MFP management page in a network not shown by a manager of the digital multi-function peripheral 1.

FIG. 5 is a diagram illustrating the configuration of the history database 26a.

In the example shown in FIG. 5, the history database 26a stores the setting history information representing the setting details (setting candidates) previously set in the simple setting screen by users. In the configuration shown in FIG. 5, the object, the number of setting times, information such as the newest setting time, the number-of-times order, the temporal order, and the non-recommended level in addition to information (such as document size, sheet size, color, double-sided print, Nin1, stapling, concentration adjustment, and operation details) representing the setting conditions in the respective setting details (setting candidates) are stored in the history database 26a.

In the history database 26a having the configuration shown in FIG. 5, if the setting details (setting candidates) comprising a combination of the same setting conditions as the performed process exist, the number of setting times and the newest setting time of the setting candidate having the same setting conditions are updated in the setting details of the process. If the previous setting details (setting candidates) comprising a combination of the same setting conditions as the performed process do not exist, the setting details of the process are stored as a new setting candidate in the history database 26a.

Figures 6, 7:
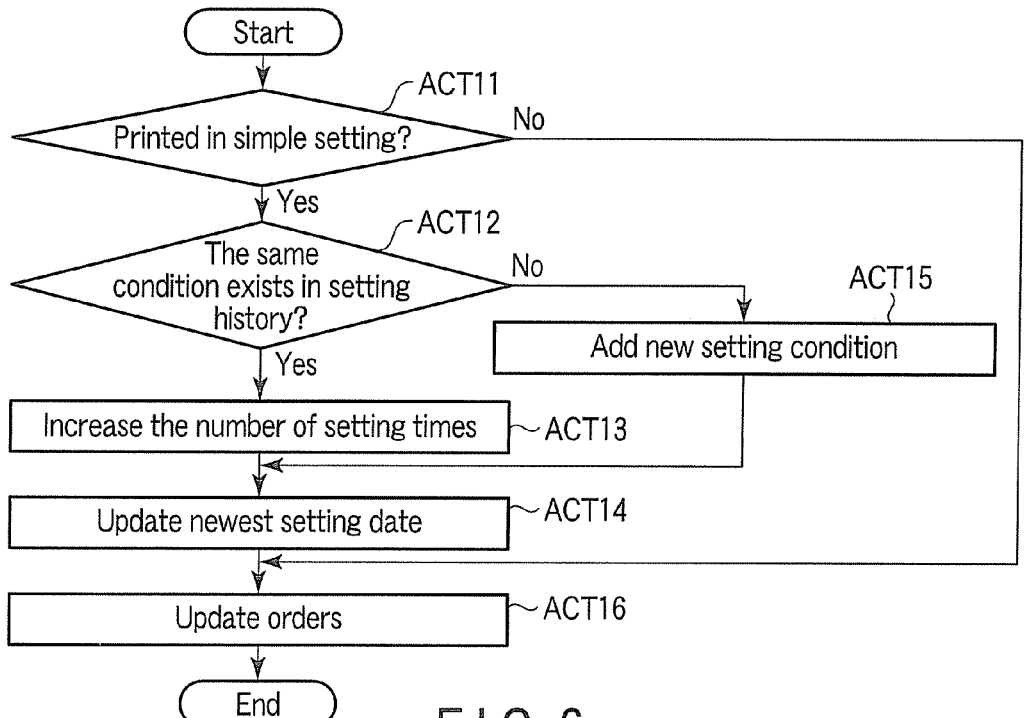
FIG. 6 is a flowchart illustrating an update process of the history database.
FIG. 7 is a diagram illustrating a configuration of an object database.

FIG. 6 is a flowchart illustrating a flow of processes of updating the history database 26a.

As shown in FIG. 6, if the process such as a copy process is performed, the processor 21 determines whether the setting of the performed process is carried out in the simple setting (ACT11). If it is determined that the setting of the performed process is not carried out in the simple setting, the processor 21 does not update the history database 26a and ends the flow of processes. If it is determined that the setting of the performed process is carried out in the simple setting, the processor 21 determines whether the previous setting details (setting candidates) comprising the same setting conditions as the setting conditions of the performed process exist in the history database 26a (ACT12).

If it is determined that a setting candidate having the same setting conditions as the performed process exists (YES in ACT12), the processor 21 increases the number of setting times of the setting detail (setting candidate) in the history database 26a (ACT13). The processor 21 changes the newest setting date to the present date (ACT14). If it is determined that the setting candidate having the same setting conditions as the performed process does not exist (NO in ACT12), the processor 21 additionally stores the setting conditions of the performed process as new setting details (setting candidate) in the history database 26a (ACT15).

If the setting candidate having the setting conditions of the performed process is updated or added, the number-of-times order and the temporal order of the setting details in the history database 26a are changed. Accordingly, the processor 21 updates the number-of-times order and the temporal order of the user setting candidates in the history database 26a on the basis of the number setting times and the newest setting time of the updated or added setting candidate (ACT16). Here, the number-of-times order and the temporal order are set by users, but the number-of-times order and the temporal order of the overall digital multi-function peripheral may be set.

The object database 26b used to determine the order of displaying the object items in the simple setting screen will be described.

The object items displayed in the simple setting screen are determined on the basis of the object history information stored in the object database 26b. That is, the processor 21 determines the display order of the object items on the basis of the numbers of setting times of the objects or the setting times of the objects stored in the object database 26b. Here, it is assumed that the object database 26b stores information on the previous setting details (setting candidates) set in the simple setting as the object history information.

That is, if a process is performed with the setting candidate selected in the simple setting screen, the object database 26b updates the number of setting times or the setting time of the object of the performed process by storing the information on the object of the performed process as the object history information by users. If the number of setting times or the setting time of the object is changed, the display order of the object items in the simple setting screen is changed. For example, even if the initial values of the objects are set, the number-of-times orders and the temporal orders of the objects are changed whenever the process is performed with the setting details selected in the simple setting screen by the user. Accordingly, the display order of the object items is changed.

FIG. 7 is a diagram illustrating the configuration of the object database 26b.

In the example shown in FIG. 7, the object database 26b stores information of the object, the number of setting times, the newest setting time, the number-of-times order, and the temporal order by users. That is, the information of the number of setting times, the newest setting time, the number-of-times order, and the temporal order in the object of the setting details (setting candidate) previously selected in the simple setting is stored in the object database 26b.

Figure 8:
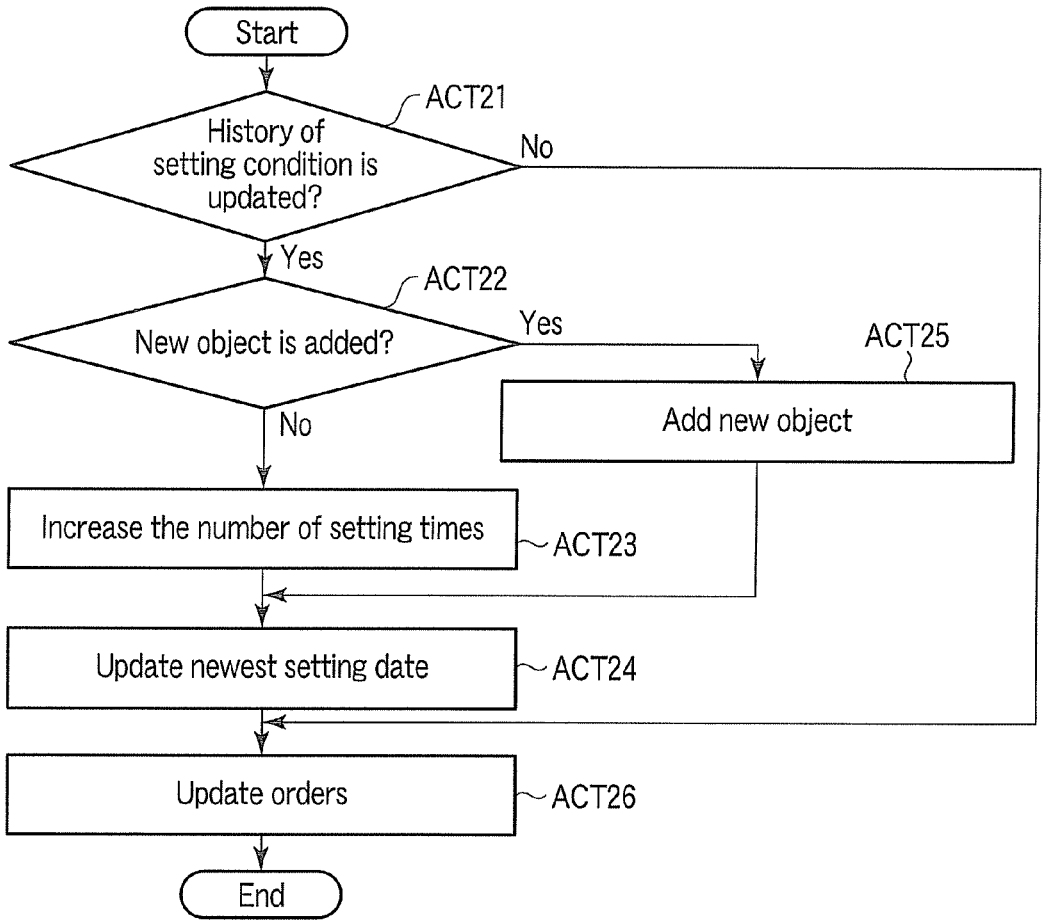
FIG. 8 is a flowchart illustrating an update process of the object database.

FIG. 8 is a flowchart illustrating a flow of processes of updating the object database 26b. Here, the object database 26b collects the information of user objects, but may collect the information of objects of the overall digital multi-function peripheral.

First, the processor 21 determines whether the setting history information in the history database 26a is updated (ACT21). If it is determined that the history database 26a is not updated (NO in ACT21), the processor 21 ends the flow of processes without updating the object database 26b.

If it is determined that the history database 26a is updated (YES in ACT21), the processor 21 determines whether a new object as the setting history information of the user is added to the history database 26a (ACT22). If it is determined that a new object is not added, that is, if the setting history information is updated by the setting candidate selected as the existing object in the history database 26a, the processor 21 increases the number of setting times of the object of the setting candidate in the object database 26b (ACT23). The processor 21 updates the newest setting time (ACT24).

If it is determined that a new object is added, that is, if a setting candidate selected with a new object is added to the history database 26a, the processor 21 adds the object of the setting candidate as a new object in the object database 26b (ACT25). If a new object is added, the processor 21 stores the number of times and the newest setting time correlated with the title (name) of the object as the object history information of the new object in the object database 26b.

If the object history information is updated with the updating of the history database 26a, the number-of-times order and the temporal order of each object in the object database 26b are changed. Accordingly, the processor 21 updates the number-of-times order and the temporal order of the objects of the user in the object database 26b on the basis of the number of setting times and the newest setting time of the updated or added object (ACT26).

Figure 9:
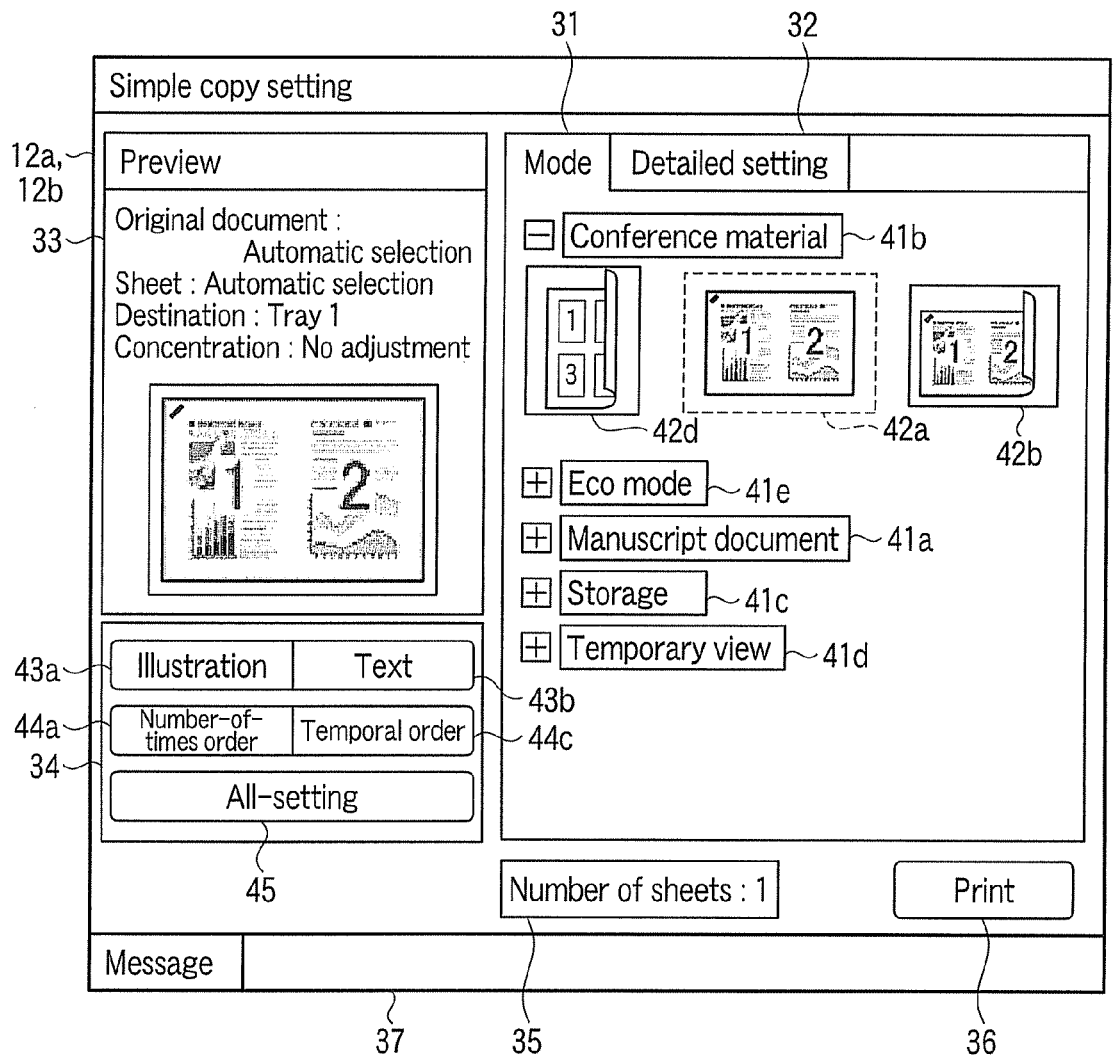
FIG. 9 is a diagram illustrating an example where object items are displayed in a display order determined as a temporal order by the object database.

FIG. 9 is a diagram illustrating an example where the object items are displayed in the display order determined depending on the times in the object database 26b shown in FIG. 7. In the object database 26b shown in FIG. 7, the temporal order of the objects is the order of "conference material", "eco mode", "manuscript document", "storage", and "temporary view". Accordingly, in FIG. 9, the object items are displayed in the order of "conference material", "eco mode", "manuscript document", "storage", and "temporary view".

If the display order of the object items can be switched by the number-of-times order button 44a and the temporal order button 44b, the user switches the display order of the object items between the number-of-times order and the temporal order. For example, if the number-of-times order button 44a is selected, the processor 21 displays the object items in the number-of-times order and displays plural setting candidates of the object with the largest number of setting times. If the temporal order button 44b is selected, the processor 21 displays the object items in the temporal order as shown in FIG. 9 and displays plural setting candidates of the object with the newest setting time.

A process of notifying a non-recommended setting candidate among the plural setting candidates displayed in the simple setting screen will be described.

Figures 10, 11:
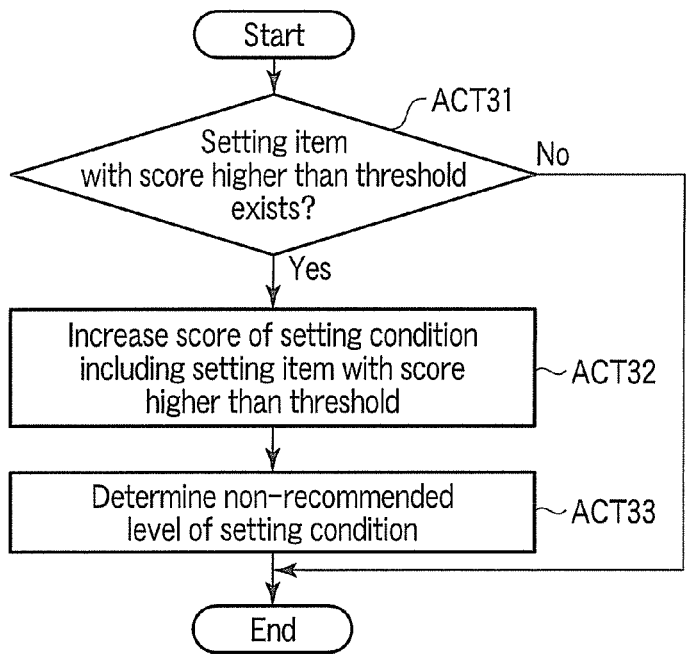
FIG. 10 is a diagram illustrating a configuration of a non-recommended data table.
FIG. 11 is a flowchart illustrating a process of setting non-recommended levels of setting candidates.

FIG. 10 shows an example of the non-recommended data table 26c representing the error occurrence frequency of the setting items. In the example shown in FIG. 10, the non-recommend data table 26c stores a type, a threshold value, and a score of each setting item. In the non-recommend data table 26c, a score is added to the setting item associated with the occurring error whenever the error occurs. For example, if an error occurs in the setting details comprising "A3" and "from one-sided to double-sided", the processor 21 adds a score to the setting item of "A3" and the setting item of "from one-sided to double-sided" in the non-recommend data table 26c. Accordingly, in the non-recommend data table 26c, the score of the setting item associated with the error increases whenever the error occurs.

In the non-recommend data table 26c, a threshold value of the score is set for each setting item. The threshold value of each setting item is a predetermined value. The threshold value represents a criterion for determining whether the possibility of a defect (such as a paper jam) in the corresponding setting item is high. That is, in the non-recommend data table 26c, it can be determined that a defect can be easily caused in the setting item the score of which is higher than the threshold value.

In the non-recommend data table 26c, a score may be added to the lifetimes of consumables or the like in addition to the occurrence of an error. For example, if an exchange time of a color toner expires, the score of the setting item of "color" in the non-recommend data table 26c may be made to increase. If a roller of a cassette is worn, the score of the setting item associated with the cassette in the non-recommend data table 26c may be made to increase.

A non-recommended level is set for each setting candidate displayed in the simple setting screen. For example, the history database 26a shown in FIG. 5 stores the non-recommended levels of the previous setting details (setting candidates). The non-recommended level represents a level of a setting candidate for alerting a user (for example, if a defect can be easily caused). The non-recommended level is determined using the non-recommend data table 26c. For example, by changing the display state of the setting candidate depending on the non-recommended level, it is possible to alert the user in the setting candidate comprising the setting item (setting condition) in which an error can easily occur.

FIG. 11 is a flowchart illustrating a flow of processes (non-recommended level setting processes) of setting the non-recommended levels of the setting candidates in the history database 26a. Here, it is assumed that the non-recommend data table 26c is properly updated depending on the occurrence of an error or the lifetime of expendables.

First, the processor 21 determines whether a setting item with a score higher than a predetermined threshold value exists among the setting items in the non-recommend data table 26c (ACT31). If it is determined that the setting item with a score higher than a predetermined threshold value does not exist (NO in ACT31), the processor 21 ends the non-recommended level setting (updating) process on the setting candidates in the history database 26a. If it is determined that the setting item with a score higher than a predetermined threshold value exists (YES in ACT31), the processor 21 increases the score of the setting candidate comprising the setting item with a score higher than a threshold value as the setting conditions among the setting candidates stored in the history database 26a (ACT32).

If the scores of the setting candidates are made to increase on the basis of the setting items with a score higher than a threshold value, the processor 21 determines the non-recommended level of each setting candidate on the basis of the score of the setting candidate (ACT33). Regarding the non-recommended level, step-like levels corresponding to the scores may be set or numerical values corresponding to the scores may be set. If the non-recommended levels of the setting candidates are determined, the processor 21 stores the non-recommended levels of the setting candidates in the history database 26a shown in FIG. 5.

For example, if a paper jam occurs at the time of double-sided printing of A3, the score of the setting item of "A3" and the score of the setting item of "double-sided" increase in the non-recommend data table 26c. As a result, if the score of the setting item of "A3" and the score of the setting item of "double-sided" are higher than the corresponding threshold values, the processor 21 increases the score of the setting candidate comprising "A3" and "double-sided" as the setting conditions among the setting candidates stored in the history database 26a. At this time, since the score of the setting candidate comprising both of "A3" and "double-sided" as the setting conditions is high, a high non-recommended level is set thereto. Since the score of the setting candidate comprising only one of "A3" and "double-sided" as the setting conditions is low, a low non-recommended level is set thereto. Since the score of the setting candidate not comprising any of "A3" and "double-sided" as the setting conditions is 0, the non-recommended level thereof is set to 0.

If an error of defective image quality often occurs in color printing, the score of the setting item of color increases in the non-recommend data table 26c. As a result, if the score of the setting item of color is higher than a threshold value, the processor 21 increases the score of the setting candidate comprising the color as the setting condition among the setting candidates stored in the history database 26a. In this case, the setting candidate comprising the color as the setting condition is set to a non-recommended level corresponding to the score thereof. Since the score of the setting candidate not comprising the color as the setting condition is 0, the non-recommended level thereof is set to 0.

FIG. 12 shows an example in which the illustrations as the setting candidates are displayed in display states corresponding to the non-recommended levels. In the example shown in FIG. 12, it is assumed that errors often occur in "A3" and "double-sided printing". If errors often occur in "A3" and "double-sided printing", the scores of the setting items of "A3" and "from one-sided to double-sided" in the non-recommend data table 26c are higher than the corresponding threshold values as shown in FIG. 10. In this case, since the score of the setting candidate comprising "A3, 2in1, from one-sided to double-sided, and stapling" as the setting conditions increases in "A3" and "from one-sided to double-sided", the non-recommended level thereof increases. The illustration 42b as the setting candidate with a high non-recommended level is masked with a dark color in the example shown in FIG. 12. Since the score of the setting candidate comprising "4in1 and from one-sided to double-sided" as the setting conditions increases only in "from one-sided to double-sided", the non-recommended level thereof is middle. The illustration 42d as the setting candidate with the middle non-recommended level is masked with a color lighter than that of the illustration with a higher non-recommended level in the example shown in FIG. 12. Since the score of the setting candidate comprising "2in1 and stapling" as the setting conditions does not increase, the non-recommended level thereof is 0. The illustration 42a as the setting candidate with a non-recommended level of 0 is not changed in the display state.

The example where the illustrations of the setting candidates are masked with brightness and darkness of a color corresponding to the non-recommended levels is described above. However, the display control corresponding to the non-recommended levels is not limited to the above-mentioned example, as long as it can alert a user depending on the non-recommended levels. For example, the illustrations or texts as the setting candidates may be displayed using plural colors (such as red, yellow, and green) corresponding to the non-recommended levels or may have marks corresponding to the non-recommended levels attached thereto.

In the example shown in FIG. 12, if a non-recommended setting candidate is selected, a message representing the reason of the non-recommendation is displayed in the message display column 37. For example, in the example shown in FIG. 12, the illustration 42b as the non-recommended setting candidate is selected and the message display column 37 displays that a paper jam often occurs in A3 and double-sided printing. This message can alert a user with the specific reason. If a severe error occurs, a user can be prompted to select a setting candidate having the setting conditions other than the setting conditions associated with the reason of the error. The messages to be displayed in the message display column 37 may be stored in the history database 26a along with the non-recommended level in correlation with the setting candidates or the setting item to be noted may be displayed with reference to the non-recommend data table 26c.

The flow of processes of providing plural object setting candidates for the overall digital multi-function peripheral 1 will be described.

Figure 13:
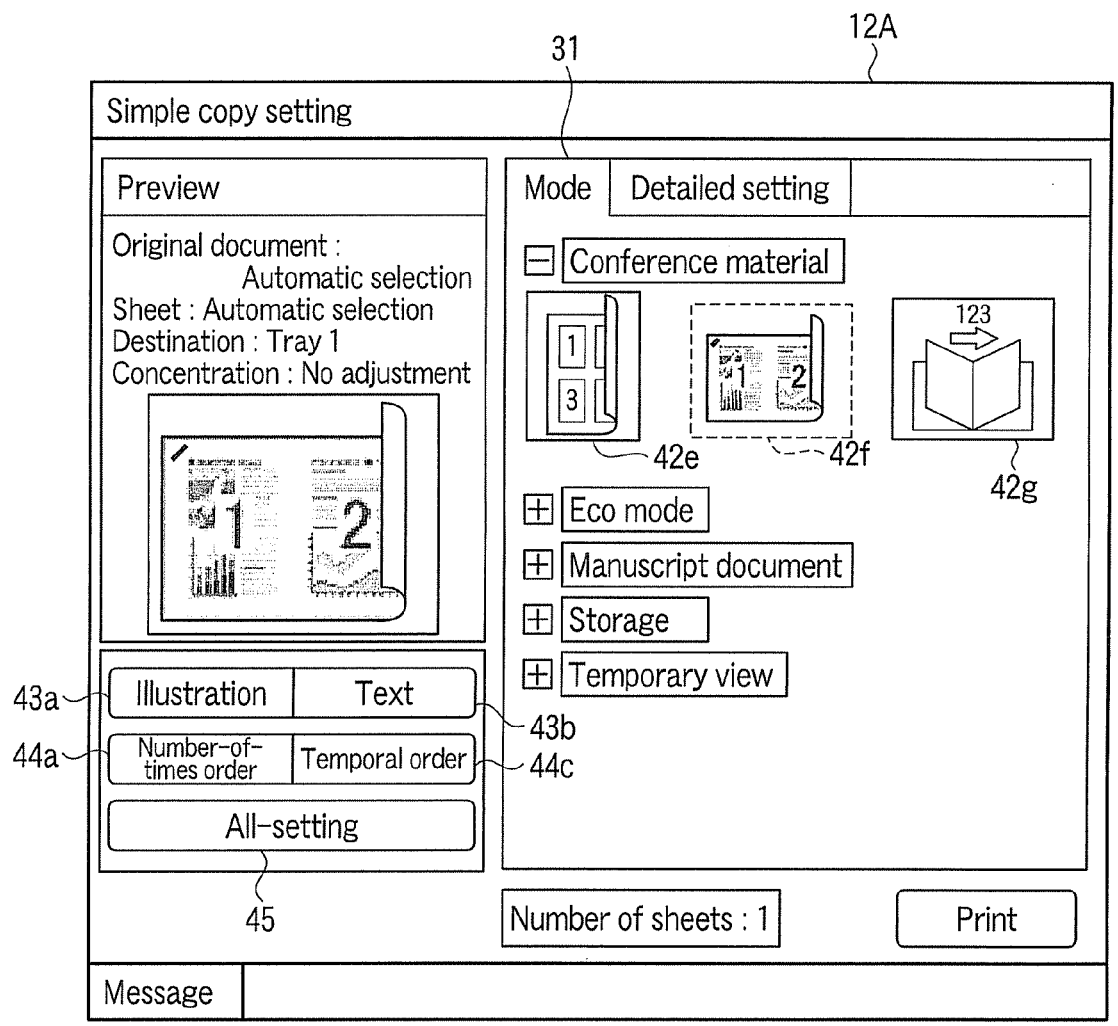
FIG. 13 is a diagram illustrating an example of a simple setting screen in which plural object setting candidates for the overall digital multi-function peripheral are displayed.

FIG. 13 is a diagram illustrating an example of the simple setting screen in which plural object setting candidates are displayed for the overall digital multi-function peripheral 1.

As shown in FIG. 13, if the all-setting button 45 is selected, the processor 21 displays illustrations 42e, 42f, and 42g of the plural setting candidates selected by objects from the setting candidates (setting candidates used by a user) used in the overall digital multi-function peripheral 1 in the mode tab 31. For example, in the example shown in FIG. 2, it is assumed that plural object setting candidates are selected and displayed from the previous setting details of the users. On the contrary, if the all-setting button 45 is selected, plural setting candidates selected by objects from the previous setting details in the overall digital multi-function peripheral 1 (as the operating apparatus) are displayed on the display unit 12a.

In the example of the simple setting screen shown in FIG. 13, the display details can be switched similarly to the example shown in FIG. 2. For example, in the simple setting screen shown in FIG. 13, the display format of the setting candidates can be switched between the illustration and the text by the use of the illustration button 43a and the text button 43b. In the simple setting screen shown in FIG. 13, the display order of the setting candidates can be switched between the number-of-times order and the temporal order by the use of the number-of-times order button 44a and the temporal order button 44b.

The plural object setting candidates in the overall digital multi-function peripheral can be selected on the basis of the information obtained by collecting the setting history information of all the users in the history database 26a shown in FIG. 5. That is, if the history database 26a is a type of storing the setting history information of all the users as shown in FIG. 5, the processor 21 generates the setting history information of the overall digital multi-function peripheral by collecting the setting history information of the users in the history database 26a. If the setting history information of the overall digital multi-function peripheral is generated, the processor 21 calculates plural object setting candidates of the overall digital multi-function peripheral by the use of the same process as the process of selecting the plural object setting candidates for each user.

The display order of the object items in the overall digital multi-function peripheral can be determined on the basis of the information obtained by collecting the object history information of all the users in the object database 26b shown in FIG. 7. That is, if the object database 26b is a type of storing the object history information of each user as shown in FIG. 7, the processor 21 generates the object history information of the overall digital multi-function peripheral by collecting the object history information of all the users in the object database 26b. If the object history information in the overall digital multi-function peripheral is generated, the processor 21 determines the display order of the object items in the overall digital multi-function peripheral by the use of the same process as the process of determining the display order of the object candidates for each user.

A total history database storing the setting history information of the overall digital multi-function peripheral and a total object database storing the object history information may be provided. In this case, the total history database and the total object database storing the object history information can be updated similarly to the history database storing the setting history information for each user and the object database storing the object history information for each user.

The overall flow of processes of displaying the simple setting screen will be described.

Figure 14:
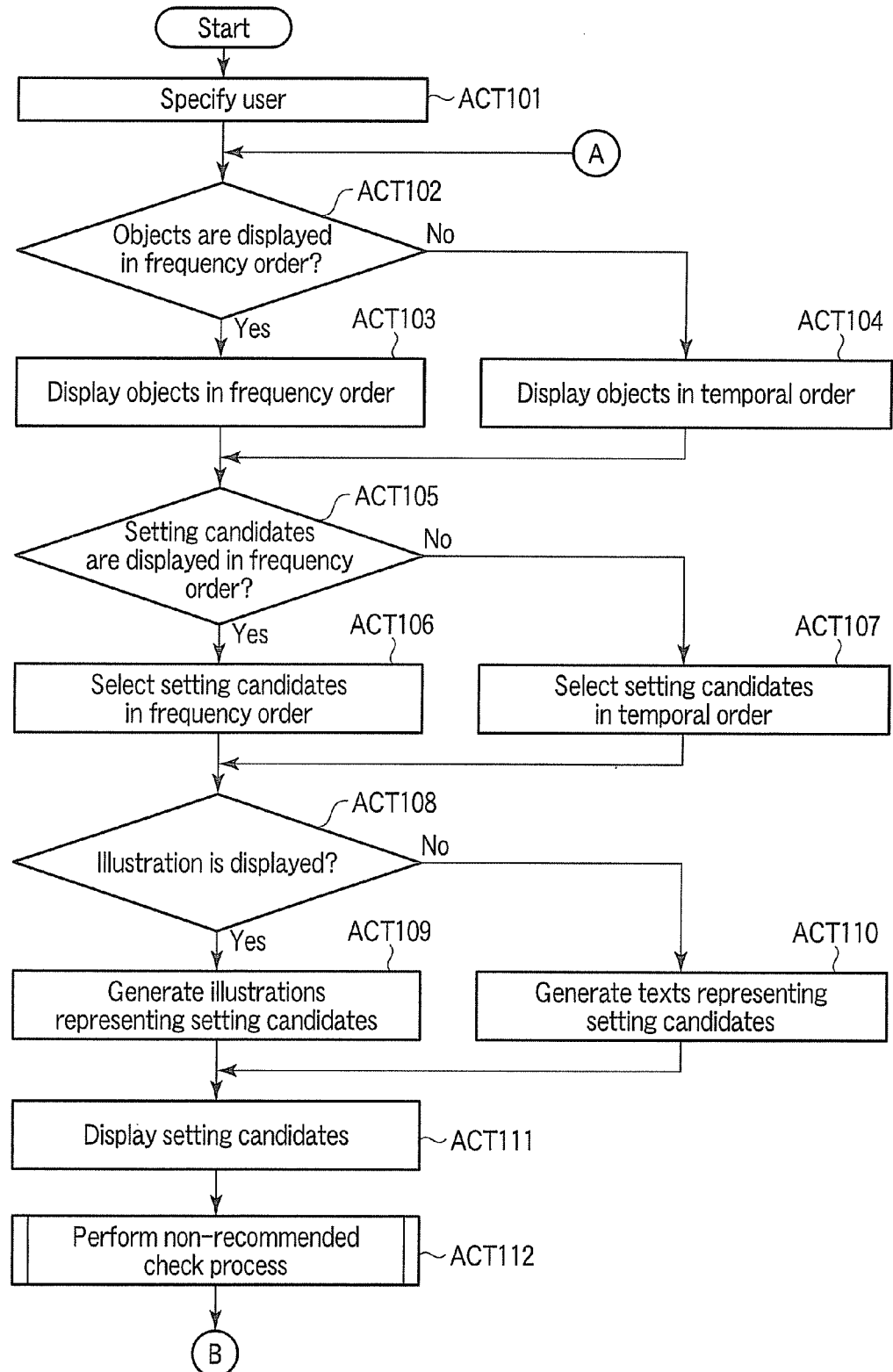
FIG. 14 is a flowchart illustrating an overall flow of processes of displaying the simple setting screen.
Figure 15:
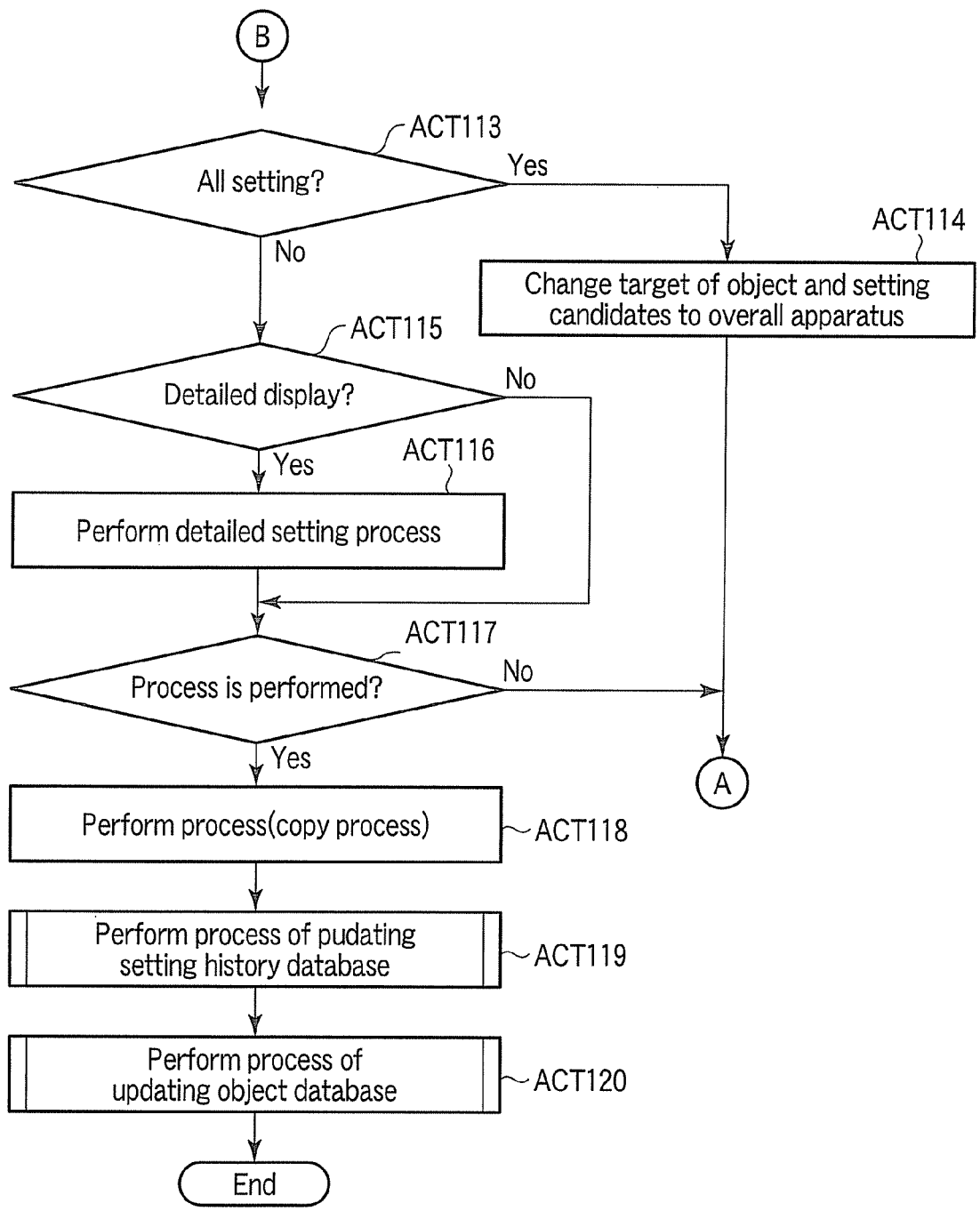
FIG. 15 is a flowchart illustrating an overall flow of processes of displaying the simple setting screen.

FIGS. 14 and 15 are flowcharts illustrating the overall flow of processes of displaying the simple setting screen.

First, the processor 21 of the digital multi-function peripheral 1 performs a process of specifying a user (ACT101). For example, the processor 21 specifies a user on the basis of the information input from the operation panel 12 by the user. If the simple setting is selected in the state where the user is specified, the processor 21 displays a simple setting screen corresponding to the user on the display unit 12a.

If the simple setting screen is displayed on the display unit 12a, the processor 21 first determines whether the object items displayed in the simple setting screen are displayed in the order (frequency order) of the numbers of setting times (frequencies) (ACT102).

If the processor 21 determines that the object items are displayed in the frequency order (YES in ACT102), the processor 21 determines the display orders of the objects on the basis of the information representing the numbers of setting times of the objects of the user stored in the object database 26b, and displays the plural object items on the display unit 12a on the basis of the display order (ACT103). If the processor 21 determines that the object items are not displayed in the frequency order, that is, if the processor 21 determines that the object items are displayed in the temporal order (NO in ACT102), the processor 21 determines the display orders of the objects on the basis of the information representing the setting times of the objects of the user stored in the object database 26b, and displays the plural object times on the display unit 12a on the basis of the display order (ACT104).

It is set in advance by a user or a manager whether the object items should be displayed in the frequency order or the temporal order. However, it may be specified by the user using the number-of-times order button 44a and the temporal order button 44b whether the object items should be displayed in the frequency order or the temporal order.

The object items displayed on the display unit 12a are displayed so as to be selected by the user using the touch panel 12b. The processor 21 sets the object item selected by the user using the touch panel 12b to a selected state. However, in the initial state, it is assumed that the processor 21 sets the object item with a highest display order to the selected state.

Then, the processor 21 determines whether the plural setting candidates of the object should be displayed in the number-of-times order (frequency order) (ACT105).

If the processor 21 determines that the plural setting candidates should be displayed in the frequency order (YES in ACT105), the processor 21 extracts the previous setting details (setting candidates) correlated with the "object" of the user corresponding to the object in the selected state from the history database 26a, and selects the plural setting candidates from the extracted setting details in the frequency order (ACT106). If the processor 21 determines that the plural setting candidates are not displayed in the frequency order, that is, if the processor determines that the object setting candidates are displayed in the temporal order (NO in ACT105), the processor 21 extracts the previous setting details (setting candidates) correlated with the "object" of the user corresponding to the object in the selected state from the history database 26a, and selects the plural setting candidates from the extracted setting details in the temporal order (ACT107).

By causing the user to select one of the number-of-times order button 44a and the temporal order button 44b, it is determined whether the setting candidates should be displayed in the frequency order or in the temporal order. The default of the frequency order or the temporal order may be set in advance by a user or a manager.

If the plural setting candidates are selected, the processor 21 determines whether the setting candidates should be in illustration (ACT108). By causing the user to select one of the illustration button 43a and the text button 43b, it is determined whether the setting candidates should be displayed in illustration or in text. The default of the illustration or the text may be set in advance by the user or a manager.

If it is determined that the setting candidates should be displayed in illustration (YES in ACT108), the processor 21 generates the illustrations representing the setting candidates on the basis of the setting conditions of the setting candidates (ACT109). For example, the illustrations representing the setting candidates are generated as the preview images intuitively showing the difference from the default setting as shown in FIG. 2. If it is determined that the setting candidates should be displayed in text (NO in ACT108), the processor 21 generates the texts representing the setting candidates on the basis of the setting conditions of the setting candidates (ACT110). For example, the texts representing the setting candidates are texts showing a difference from the default setting as shown in FIG. 3. If the illustrations or texts representing the plural object setting candidates are generated, the processor 21 displays the plural generated illustrations or the plural generated texts as the setting candidates on the display unit 12a (ACT111).

If the plural setting candidates are displayed, the processor 21 makes a display corresponding to the non-recommended levels of the setting candidates (ACT112). The non-recommended levels of the setting candidates may be determined by the non-recommended level setting process as shown in FIG. 11 and are stored in the history database 26a. Accordingly, the processor 21 changes the display states of the setting candidates depending on the non-recommended levels stored in the history database 26a. For example, the processor 21 changes the colors displaying the setting candidates or displays the reasons of the non-recommendation in the message display column depending on the non-recommended levels as described above.

The processor 21 determines whether the all-setting button 45 is selected in the simple setting screen (ACT113). If it is determined that the all-setting button 45 is selected in the simple setting screen (YES in ACT113), the processor 21 changes the target from which the object items and the setting candidates should be selected to the overall digital multi-function peripheral, not the respective user (ACT114). That is, if the all-setting button 45 is selected, the processor 21 determines the display order of the object items or selects the plural setting candidates for each object, on the basis of the setting details previously set by the users for the digital multi-function peripheral. The object item displaying process, the object setting candidate displaying process, and the like of the overall digital multi-function peripheral are performed by changing the processing target in the processes of ACT102 to ACT112 from the users to the overall digital multi-function peripheral as the operating apparatus.

If the processor 21 determines that the all-setting button 45 is not selected in the simple setting screen (NO in ACT113), the processor 21 determines whether the detailed display tab 32 is selected in the simple setting screen (ACT115). If it is determined that the detailed display tab 32 is selected in the simple setting screen (YES in ACT115), the processor 21 displays the detailed setting screen in which the setting conditions of the setting candidates in the selected state in the mode tab 31 reflected (ACT116). As shown in FIG. 4, the user can change the setting conditions in the detailed setting screen as the detailed setting tab in the simple setting screen. The setting conditions changed in the detailed setting tab are reflected as the setting conditions of the setting candidates selected in the mode tab.

The processes of ACT102 to ACT116 are repeatedly performed until it is instructed to perform the process or the display of the simple setting screen is cancelled. For example, if the print button 36 as a button for instructing to perform the process is selected in the simple setting screen (YES in ACT117), the processor 21 performs the process with the setting conditions of the setting candidate in the selected state (ACT118).

If the process is performed with the setting candidate selected in the simple setting, the processor 21 performs the process of updating the history database 26a on the basis of the setting details of the performed process (ACT119). The process of updating the history database 26a can employ, for example, the process described with reference to FIG. 6. If the history database 26a is updated, the processor 21 performs the process of updating the object database 26b (ACT120). The process of updating the object database 26b can employ, for example, the process described with reference to FIG. 8.

If an error occurs while performing the process, the processor 21 may update the non-recommended data table 26c and may perform the process of setting the non-recommended levels of the setting candidates.

In the above-mentioned embodiment, by causing a user to display plural setting candidates comprising various setting conditions depending on the objects of each user, the user can easily perform a desired setting operation with a small number of operations. By displaying the plural setting candidates for each object in illustrations, it is possible to display the setting candidates which can be intuitively easily shown. The user can change the setting conditions of the displayed setting candidates in the detailed setting screen. As a result, it is possible to provide the detailed setting screen in which the setting conditions of the setting candidates for each object is reflected and to perform a setting operation desired by the user with a simple operation even if the setting conditions are set in details. By analyzing the object items for each user, it is possible to display the object candidates in the use frequency or in the temporal order and to provide a display screen in which the object desired by the user can be easily searched for.

In the above-mentioned embodiment, by changing the display states of the setting candidates comprising the setting item with the high error occurrence possibility or the setting item whose lifetime of expendables is about to expire, it is possible to inform the user of the non-recommended setting details in which a defect giving the user stress, such as deterioration in image quality or a paper jam, can easily occur.

In the above-mentioned embodiment, by providing plural setting candidates for each object used in the overall digital multi-function peripheral as well as for each user, a user poor at operations or a user having small opportunity of use can easily search for the setting candidates corresponding to the object. Since a user can easily change any setting condition of the setting candidate selected from the setting candidates used in the overall digital multi-function peripheral, it is possible to easily arrange the setting details, which were previously performed by other users, in desired setting details.

Figure 16:
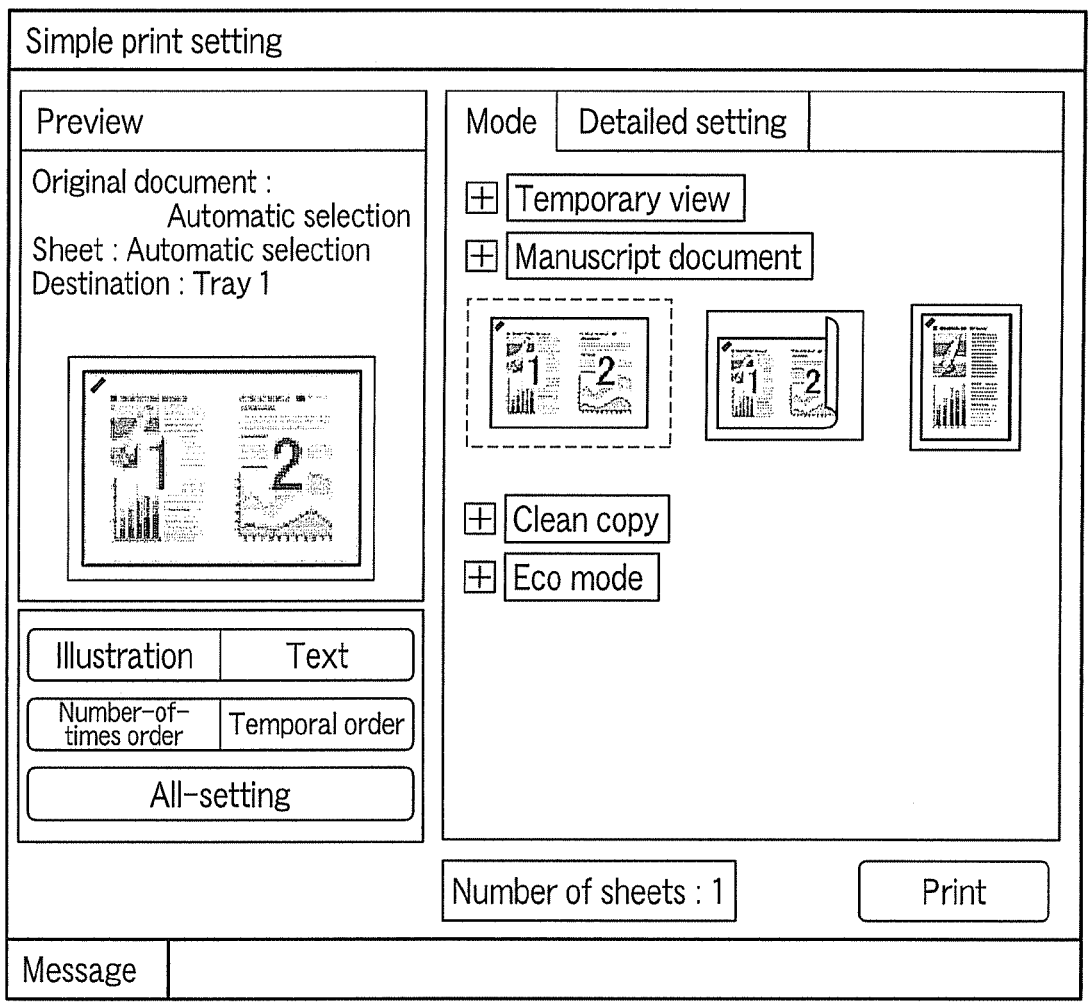
FIG. 16 is a diagram illustrating an example of the simple setting screen in which plural object setting candidates in simple print setting are displayed.
Figure 17:
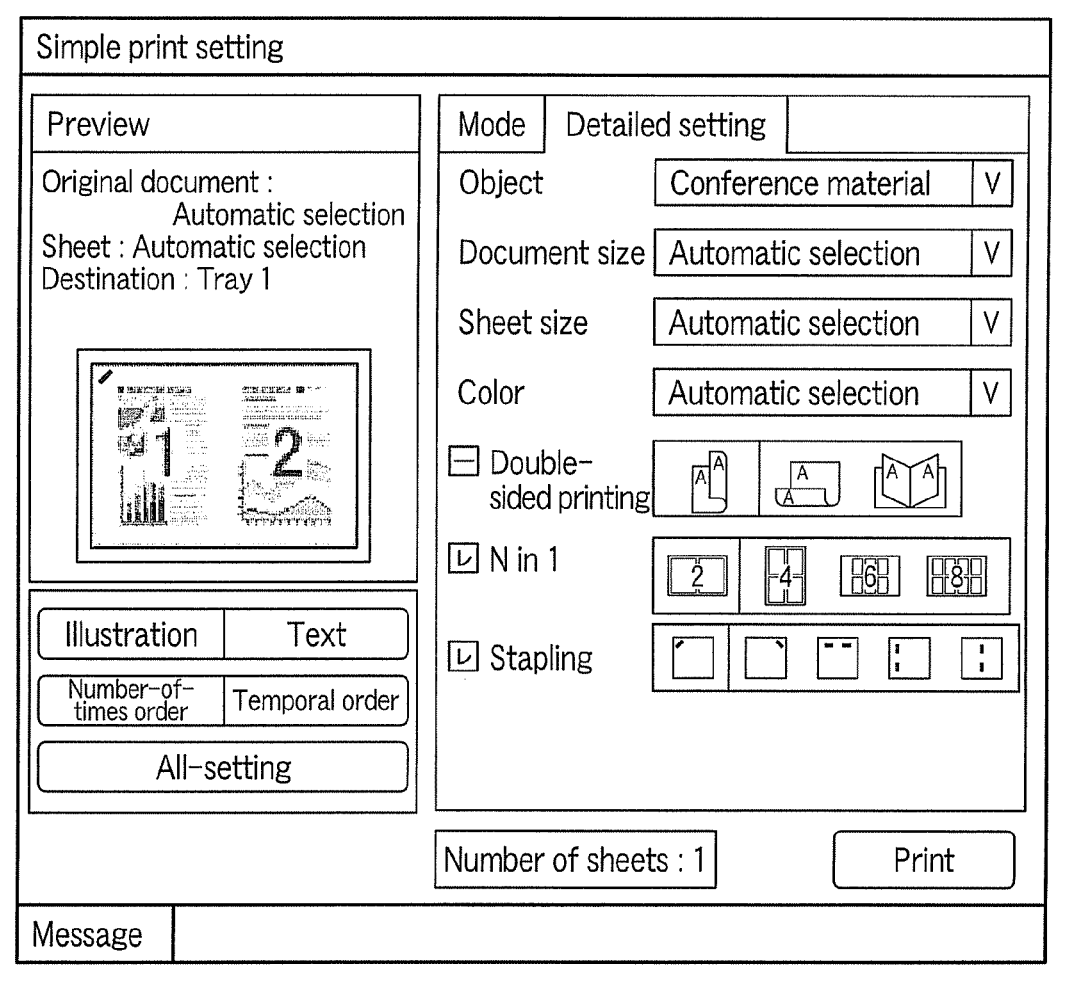
Figure 19:
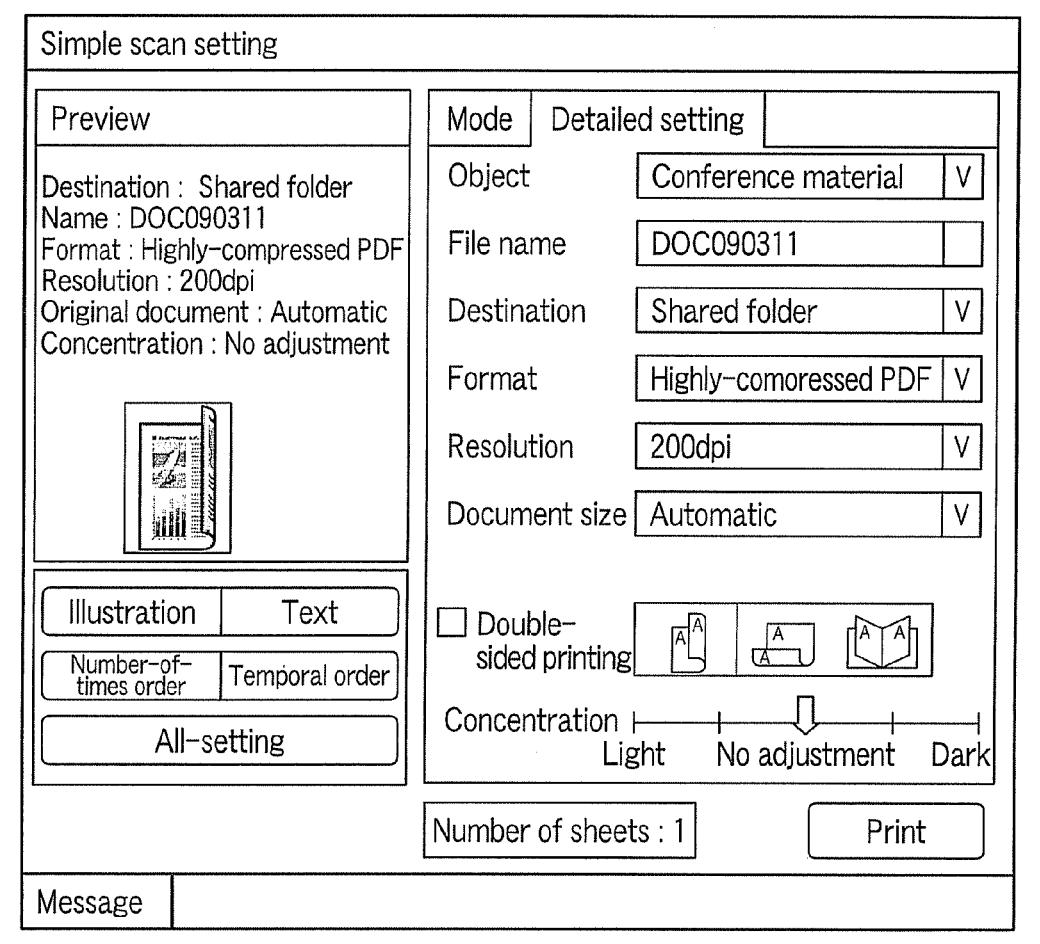

In the above-mentioned embodiment, the setting screen for the copy process is exemplified, but the same simple setting screen can be applied to a printing process or a scanning process. For example, FIG. 16 shows an example of a "mode" tab in the simple print setting. FIG. 17 shows an example of a "detailed setting" tab in the simple print setting. FIG. 18 shows an example of a "mode" tab in a simple scan setting. FIG. 19 shows an example of a "detailed setting" tab in the simple scan setting. The display screens shown in FIGS. 16, 17, 18, and 19 are different from each other only in setting items and have the same configuration as described in the above-mentioned copy process. That is, the processes of displaying the display screens shown in FIGS. 16, 17, 18, and 19 can be embodied by the same process as the above-mentioned copy process.

However, the simple print setting may be embodied by the use of a printer driver executed by the processor 21 of a device such as personal computer (PC) connected to the digital multi-function peripheral via an interface. In this case, the processor of the device such as a PC requests the digital multi-function peripheral 1 for display data of the simple setting screen and displays the simple setting screen on the display unit on the basis of the data acquired from the digital multi-function peripheral 1. That is, the device connected to the digital multi-function peripheral 1 can perform the same process as the above-mentioned simple setting process in communication with the digital multi-function peripheral 1 by causing the processor to execute the printer driver.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A condition setting device of processing related to printing comprising:
    a memory configured to store a plurality of previous setting details comprising a combination of a plurality of setting conditions in correlation with objects of processing related to printing;
    a display configured to display a list of the objects of processing related to printing stored in the memory, and to display a setting candidate selected on the basis of an object; and
    a processor configured to select as the setting candidate the setting details corresponding to the object, which is selected from the list of objects displayed by the display, to cause the display to display the selected setting candidates, and
    to store the setting details of the processing related to printing, which is performed in a state where one setting candidate is selected from the setting candidates displayed by the display, in the memory, wherein
    the memory stores non-recommended levels in correlation with the previous setting details, and
    the display changes a display state of each setting candidate on the basis of the non-recommended level of the setting details displayed as the setting candidate.

2. The device according to claim 1, wherein the processor further generates illustrations representing setting conditions in the selected setting candidate, and
    the display displays the illustrations generated by the processor as the setting candidates.

3. The device according to claim 1, wherein the memory stores the number of setting times in correlation with the setting details,
    the processor updates the number of setting times for the setting details of an executed process stored in the memory, and
    the processor selects a plurality of setting candidates on the basis of the number of setting times for the setting details stored in the memory.

4. The device according to claim 1, wherein the memory stores newest setting time and date in correlation with the setting details, the processor updates the newest setting time and date for the setting details of an executed process stored in the memory, and the processor selects a plurality of setting candidates on the basis of the newest setting time and date for the setting details stored in the memory.

5. The device according to claim 1, wherein the memory further stores the number of setting times for the objects of the setting details, and the display determines the object to be displayed in an initial state on the basis of the number of setting times for the objects stored in the memory.

6. The device according to claim 1, wherein the memory further stores newest setting time and date for the objects of the setting details, and the display determines the list of objects to be displayed in an initial state on the basis of the newest setting time and date for the objects stored in the memory.

7. The device according to claim 1, wherein the processor further sets the non-recommended levels of the setting candidates stored in the memory on the basis of information representing setting items with high possibility of a defect.

8. The device according to claim 1, wherein the memory stores the previous setting details every user, and the processor selects the setting candidate corresponding to the object, which is selected from the objects displayed in the first display area, from the user setting details stored in the memory.

9. The device according to claim 8, wherein if a request for displaying the previous setting details in an image forming apparatus is received, the processor selects the setting candidate corresponding to the object, which is selected from the list of objects displayed by the display, from the previous setting details, which are stored in the memory, in the image forming apparatus.

10. A condition setting method of processing related to printing comprising:

storing in a memory a plurality of previous setting details comprising a combination of a plurality of setting conditions in correlation with objects of processing related to printing;

displaying on a display the stored list of objects of processing related to printing;

selecting as a setting candidate the setting details corresponding to the object, which is selected from the list of displayed objects, from the stored plurality of previous setting details;

displaying on the display the setting candidates selected on the basis of the selected object, with the list of objects;

updating the memory by storing the setting details of the processing related to printing, which is executed in a state where one setting candidate is selected from the setting candidates displayed on the display; and storing non-recommended levels in correlation with the previous setting details, wherein the displaying of the setting candidate further comprises changing a display state of each setting candidate on the basis of the non-recommended level of the setting details displayed as the setting candidate.

11. The method according to claim 10, further comprising generating illustrations representing setting conditions in the selected setting candidate, wherein the displaying of the setting candidates comprises displaying the generated illustrations as the setting candidates.

12. The method according to claim 10, further comprising storing the number of setting times in correlation with the setting details, wherein the updating comprises updating the number of setting times for the setting details of an executed process stored in the memory, and the selecting of the setting candidate comprises selecting a plurality of setting candidates on the basis of the number of setting times for the setting details stored in the memory.

13. The method according to claim 10, further comprising storing newest setting time and date in correlation with the setting details, wherein the updating comprises updating the newest setting time and date for the stored setting details of an executed process, and the selecting of the setting candidate comprises selecting a plurality of setting candidates on the basis of the newest setting time and date for the stored setting details.

14. The method according to claim 10, further comprising storing the number of setting times for the objects of the setting details in the memory, wherein the displaying of the object comprises determining the object to be displayed in an initial state on the basis of the number of setting times for the objects stored in the memory.

15. The method according to claim 10, further comprising storing newest setting time and date for the objects of the setting details, wherein the displaying of the object comprises determining the object to be displayed in an initial state on the basis of the newest setting time and date for the stored objects.

16. The method according to claim 10, further comprising setting the non-recommended levels of the stored setting candidates on the basis of information representing setting items with high possibility of a defect.

17. The method according to claim 10, further comprising storing the previous setting details for every user, and the selecting of the setting candidate comprises selecting the setting candidate corresponding to the object, which is selected from the displayed objects, from the stored user setting details.

18. The method according to claim 17, wherein if a request for displaying the previous setting details in an image forming apparatus is received, the selecting of the setting candidate comprises selecting the setting candidate corresponding to the object, which is selected from displayed the objects, from the stored previous setting details, in the image forming apparatus.

* * * * *